US010911386B1

(12) United States Patent
Beckman et al.

(10) Patent No.: US 10,911,386 B1
(45) Date of Patent: Feb. 2, 2021

(54) THREAD VISUALIZATION TOOL FOR ELECTRONIC COMMUNICATION DOCUMENTS

(71) Applicant: KCURA LLC, Chicago, IL (US)

(72) Inventors: Andrea Beckman, Chicago, IL (US); Elise Tropiano, Evanston, IL (US); David Bishop, Chicago, IL (US); Benjamin George Cabot, Portland, OR (US); Brandon Gauthier, Centreville, VA (US)

(73) Assignee: RELATIVITY ODA LLC, Chicago, IL (US)

( * ) Notice: Subject to any disclaimer, the term of this patent is extended or adjusted under 35 U.S.C. 154(b) by 190 days.

(21) Appl. No.: 15/423,188

(22) Filed: Feb. 2, 2017

Related U.S. Application Data

(60) Provisional application No. 62/453,072, filed on Feb. 1, 2017.

(51) Int. Cl.
*H04L 12/58* (2006.01)
*G06F 16/93* (2019.01)
(Continued)

(52) U.S. Cl.
CPC ........ *H04L 51/16* (2013.01); *G06F 16/24578* (2019.01); *G06F 16/285* (2019.01);
(Continued)

(58) Field of Classification Search
CPC ....... H04L 51/16; H04L 51/08; G06F 16/358; G06F 16/345; G06F 16/24578; G06F 16/285; G06F 16/93
See application file for complete search history.

(56) References Cited

U.S. PATENT DOCUMENTS 6,487,360 B1 * 11/2002 Sumiyoshi ........... G11B 27/034
386/278
6,771,287 B1 * 8/2004 Walker .................... H04L 41/22
709/224

(Continued)

OTHER PUBLICATIONS

Mark H. Walker and Franklin Tessler, Office 2004 for Macintosh: The Missing Manual (1st Ed., 2005), O'Reilly Media, Inc. (Year: 2005).*

(Continued)

*Primary Examiner* — Justin R. Blaufeld
(74) *Attorney, Agent, or Firm* — Marshall, Gerstein & Borun LLP

(57) ABSTRACT

A method for facilitating document review includes determining an ordered relationship among electronic communication documents in a conversation thread group. The ordered relationship specifies a time sequence of documents in each of one or more conversation threads within the thread group. Each conversation thread begins with the same root document and ends with a different end document. The method also includes causing a visualization of the thread group to be presented to a user via a GUI. The visualization includes graphic elements corresponding to different electronic communication documents, and each element is at a respective position along first and second axes of the visualization in accordance with the ordered relationship. The first axis is indicative of how many electronic communications were sent, within a given conversation thread, after the root document was sent, and the second axis is generally indicative of how many conversation threads are in the thread group.

21 Claims, 9 Drawing Sheets

(51) Int. Cl.
*G06F 16/28* (2019.01)
*G06F 16/2457* (2019.01)
*G06F 16/35* (2019.01)
*G06F 16/34* (2019.01)
*G06F 3/0482* (2013.01)
*G06Q 50/18* (2012.01)

(52) U.S. Cl.
CPC .......... *G06F 16/345* (2019.01); *G06F 16/358* (2019.01); *G06F 16/93* (2019.01); *H04L 51/08* (2013.01); *G06F 3/0482* (2013.01); *G06Q 50/18* (2013.01); *H04L 51/04* (2013.01)

(56) References Cited

U.S. PATENT DOCUMENTS

| | | | | |
|---|---|---|---|---|
| 7,472,357 | B1* | 12/2008 | Satterfield | G06F 3/048 709/206 |
| 7,506,263 | B1* | 3/2009 | Johnston | G06Q 10/107 709/206 |
| 9,258,195 | B1* | 2/2016 | Pendleton | H04L 41/22 |
| 2002/0075322 | A1* | 6/2002 | Rosenzweig | G06F 16/58 715/835 |
| 2002/0147805 | A1* | 10/2002 | Leshem | H04L 29/06 709/223 |
| 2003/0225829 | A1* | 12/2003 | Pena | G06F 16/957 709/203 |
| 2004/0221295 | A1* | 11/2004 | Kawai | H04L 51/08 719/313 |
| 2005/0004990 | A1* | 1/2005 | Durazo | G06Q 10/107 709/206 |
| 2005/0060643 | A1* | 3/2005 | Glass | G06F 40/169 715/205 |
| 2005/0246283 | A1* | 11/2005 | Gwiazda | G06Q 10/10 705/52 |
| 2008/0037721 | A1* | 2/2008 | Yao | H04M 3/53 379/88.11 |
| 2008/0208992 | A1* | 8/2008 | Madnani | G06Q 10/107 709/206 |
| 2009/0012984 | A1* | 1/2009 | Ravid | G06K 9/00469 |
| 2009/0055413 | A1* | 2/2009 | Audet | G06F 3/04842 |
| 2010/0030798 | A1* | 2/2010 | Kumar | G06F 16/954 707/737 |
| 2011/0231499 | A1* | 9/2011 | Stovicek | G06Q 10/107 709/206 |
| 2012/0158728 | A1* | 6/2012 | Kumar | G06F 16/48 707/737 |
| 2012/0210334 | A1* | 8/2012 | Sutedja | H04L 51/16 719/314 |
| 2012/0278761 | A1* | 11/2012 | John | G06F 3/0482 715/810 |
| 2013/0067328 | A1* | 3/2013 | Salyards | G06F 16/74 715/716 |
| 2013/0124548 | A1* | 5/2013 | Chhaparia | G06F 16/245 707/758 |
| 2013/0179801 | A1* | 7/2013 | Audet | G06F 3/0482 715/752 |
| 2014/0143680 | A1* | 5/2014 | Angarita | G06F 16/137 715/751 |
| 2014/0245178 | A1* | 8/2014 | Smith | H04L 51/16 715/753 |
| 2017/0272388 | A1* | 9/2017 | Bern | H04L 51/12 |
| 2018/0011880 | A1* | 1/2018 | DiSalvo | G06F 16/215 |
| 2018/0196589 | A1* | 7/2018 | Feit | G06F 3/0482 |

OTHER PUBLICATIONS

J.D. Biersdorver, Cracking the Mystery of the Missing iTunes Files, N.Y. Times, Mar. 18, 2016, <https://nytimes.com/2016/03/19/technology/personaltech/cracking-the-mystery-of-the-missing-itunes-files.html> (Year: 2016).*

Resubmission Discovery Tools, no later than Feb. 1, 2017, 2 pages.

* cited by examiner

150

| 152 EMAIL DOC | 154 FINGERPRINT ID |
|---|---|
| L0 - R1 | A |
| L1 - R1 | A-B |
| L2 - R1 | A-B-C |
| L2 - R2 | A-B-M |
| L2 - R3 | A-B-X |
| L3 - R1 | A-B-C-D |
| L3 – R2 | A-B-M-N |
| L4 – R1 | A-B-C-D-E |
| L4 – R2 | A-B-M-N-O |
| L5 – R2 | A-B-M-N-O-P |

Return to document list
EN21
− 100% +

Document 20 of 5000
Edit | First Pass Review ▼

First Pass Review
Control Number: EN21
Responsive Designation: Responsive
Confidential Designation:
Attorney Review Comments:
Issue Designation:
Inclusive Reason: MESSAGE

— 240
— 206

From: Paul Ahrens
Sent: Thursday, October 24, 2003 11:30 PM
To: Mike McGinn <nmcginn@enron.com>
CC: John Acorn <jacorn@enron.com>
Subject: RE: RE: RE: FW: RE: Feedback requested Cool, thanks Mike!

Paul Ahrens
Sent from my Blackberry

From: Mike McGinn
Sent: Thursday, October 24, 2003 11:12 AM
To: Paul Ahrens <pahrens@enron.com>
CC: John Acorn <jacorn@enron.com>
Subject: RE: RE: RE: FW: RE: Feedback requested Thanks for your input. Please see my responses inline in red.

Thanks,
Mike McGinn

— 202
— 210
1/1

C00006b33 Thread Group
0 1 2 3 4 5 6 7 8 9 10 11 12 13

— 204

LEGEND
■ Inclusive
□ Not Inclusive
⋮ Missing
▢ Duplicate Spare
◻ Attachment

DISPLAY OPTIONS ▼

— 200
— 212
— 226
— 230
— 232
— 222
— 224
— 226
— 220

250

| 252 EMAIL DOC | 254 FINGERPRINT ID |
|---|---|
| L0 - R1 | A |
| L2 - R1 | A-B-C |
| L2 - R2 | A-B-M |
| L2 - R3 | A-B-X |
| L3 - R1 | A-B-C-D |
| L3 – R2 | A-B-M-N |
| L4 – R1 | A-B-C-D-E |
| L4 – R2 | A-B-M-N-O |
| L5 – R2 | A-B-M-N-O-P |

*FIG. 5*

THREAD VISUALIZATION TOOL FOR ELECTRONIC COMMUNICATION DOCUMENTS

CROSS-REFERENCE TO RELATED APPLICATIONS

This claims the benefit of U.S. Provisional Patent Application No. 62/453,072, filed on Feb. 1, 2017 and entitled "Email Thread Visualization Tool," the disclosure of which is hereby incorporated herein by reference in its entirety.

FIELD OF THE DISCLOSURE

The present disclosure generally relates to electronic document review and, more specifically, to techniques for facilitating the review of electronic communication documents such as emails.

BACKGROUND

In various applications, a need exists to extract meaningful information from a corpus of electronic documents. In the discovery process commonly associated with litigation, for example, attorneys are commonly provided a large corpus of electronic documents, including electronic communication documents such as emails, that were received from (or may be sent to) an opposing party. Given the potentially enormous number of such documents (e.g., in the millions), analyzing each and every electronic communication document can be an extremely time-consuming process. Typically, many of these electronic communication documents convey redundant information. In an email context, for example, the corpus of emails may include a copy of a particular email from the sender's outbox, and another copy from the inbox of each recipient. In such instances, a reviewer does not need to review each copy of the email to determine whether the email is relevant to the discovery process. As another example, an email message may include information from previous emails within an email chain (e.g., as can be seen by scrolling down while viewing the email), with the final email of a chain typically containing all of the information conveyed by prior emails within the same "conversation." In such instances, these prior emails can be safely discarded or ignored without losing any meaningful information.

"Threading" (e.g., "email threading") is a process that reduces the number of documents in a corpus of electronic communication documents by removing electronic communication documents that fail (or very likely fail) to convey new information. An email may convey new information, if, for example, the email includes a new recipient or attachment, the subject and/or the body of the email is not included in any other emails in the same chain or conversation, and/or the email is a final email in the chain or conversation.

Electronic document review tools that organize electronic communication documents according to thread can provide great efficiencies in the user review process. For example, a user reviewing documents may be able to quickly identify which emails within a particular corpus of emails share a common thread (or share a common group of related threads that branch off of each other), and focus solely on that set of emails before moving on to the next thread or thread group. It can be quite difficult, however, for a user to truly understand an email chain of moderate to high complexity, even if the document review tool or back-end processing is capable of determining the precise relationship among all of the emails in the chain. Without a deep understanding of the structure or "story" of a particular email chain, numerous problems can arise. The reviewer may fail to properly or consistently tag or code emails within the chain (e.g., as "privilege" or "no privilege" in a litigation context), for example, or may have trouble quickly navigating from one email that is currently being reviewed to a particular other email of interest in the chain, etc.

BRIEF SUMMARY

In one aspect, a computer-implemented method for facilitating user review of electronic communication documents includes determining, by one or more processors, an ordered relationship among a plurality of electronic communication documents in a conversation thread group. The ordered relationship specifies a time sequence of electronic communication documents in each of one or more conversation threads within the conversation thread group. Each of the one or more conversation threads begins with a same root document of the plurality of electronic communication documents and ends with a different end document of the plurality of electronic communication documents. The method also includes causing, by one or more processors, a visualization of the conversation thread group to be presented to a user via a graphical user interface of a client device. Causing the visualization of the conversation thread group to be presented to the user includes causing a plurality of graphic elements, each corresponding to a different one of the plurality of electronic communication documents, to be displayed at respective positions along a first axis and a second axis of the visualization in accordance with the determined ordered relationship. The first axis is indicative of how many electronic communications were sent, within a given conversation thread of the conversation thread group, after the root document was sent. For each branching point of any branching points within the conversation thread group, the second axis is indicative of how many conversation threads stem from the branching point.

In another aspect, a computing system includes an electronic document database, one or more processors, and one or more memories storing instructions. The instructions, when executed by the one or more processors, cause the one or more processors to determine an ordered relationship among a plurality of electronic communication documents in a conversation thread group. The ordered relationship specifies a time sequence of electronic communication documents in each of one or more conversation threads within the conversation thread group. Each of the one or more conversation threads begins with a same root document of the plurality of electronic communication documents and ends with a different end document of the plurality of electronic communication documents. The instructions also cause the one or more processors to cause a visualization of the conversation thread group to be presented to a user via a graphical user interface of a client device, at least by causing a plurality of graphic elements, each corresponding to a different one of the plurality of electronic communication documents, to be displayed at respective positions along a first axis and a second axis of the visualization in accordance with the determined ordered relationship. The first axis is indicative of how many electronic communications were sent, within a given conversation thread of the conversation thread group, after the root document was sent. For each branching point of any branching points within the conversation thread group, the second axis is indicative of how many conversation threads stem from the branching point.

In another aspect, a computer-implemented method for facilitating user review of electronic communication documents includes receiving, from a remote server, data indicating an ordered relationship among a plurality of electronic communication documents in an conversation thread group. The ordered relationship specifies a time sequence of electronic communication documents in each of one or more conversation threads within the conversation thread group. Each of the one or more conversation threads begins with a same root document of the plurality of electronic communication documents and ends with a different end document of the plurality of electronic communication documents. The method also includes presenting, based on the received data, a visualization of the conversation thread group to a user via a graphical user interface of a client device. Presenting the visualization of the conversation thread group to the user includes displaying a plurality of graphic elements, each corresponding to a different one of the plurality of electronic communication documents, at respective positions along a first axis and a second axis of the visualization in accordance with the indicated ordered relationship. The first axis is indicative of how many electronic communications were sent, within a given conversation thread of the conversation thread group, after the root document was sent. For each branching point of any branching points within the conversation thread group, the second axis is indicative of how many conversation threads stem from the branching point.

BRIEF DESCRIPTION OF THE DRAWINGS

FIG. 3 depicts an example set of associations between nodes and fingerprint identifiers that may correspond to the graphical user interface and scenario shown in FIG. 2, according to one embodiment.

FIG. 4 depicts an example graphical user interface in which a missing email is represented, according to one embodiment and/or scenario.

FIG. 5 depicts an example set of associations between emails and fingerprint identifiers that may correspond to the graphical user interface and scenario shown in FIG. 4, according to one embodiment.

DETAILED DESCRIPTION

I. Overview

Figure 1:
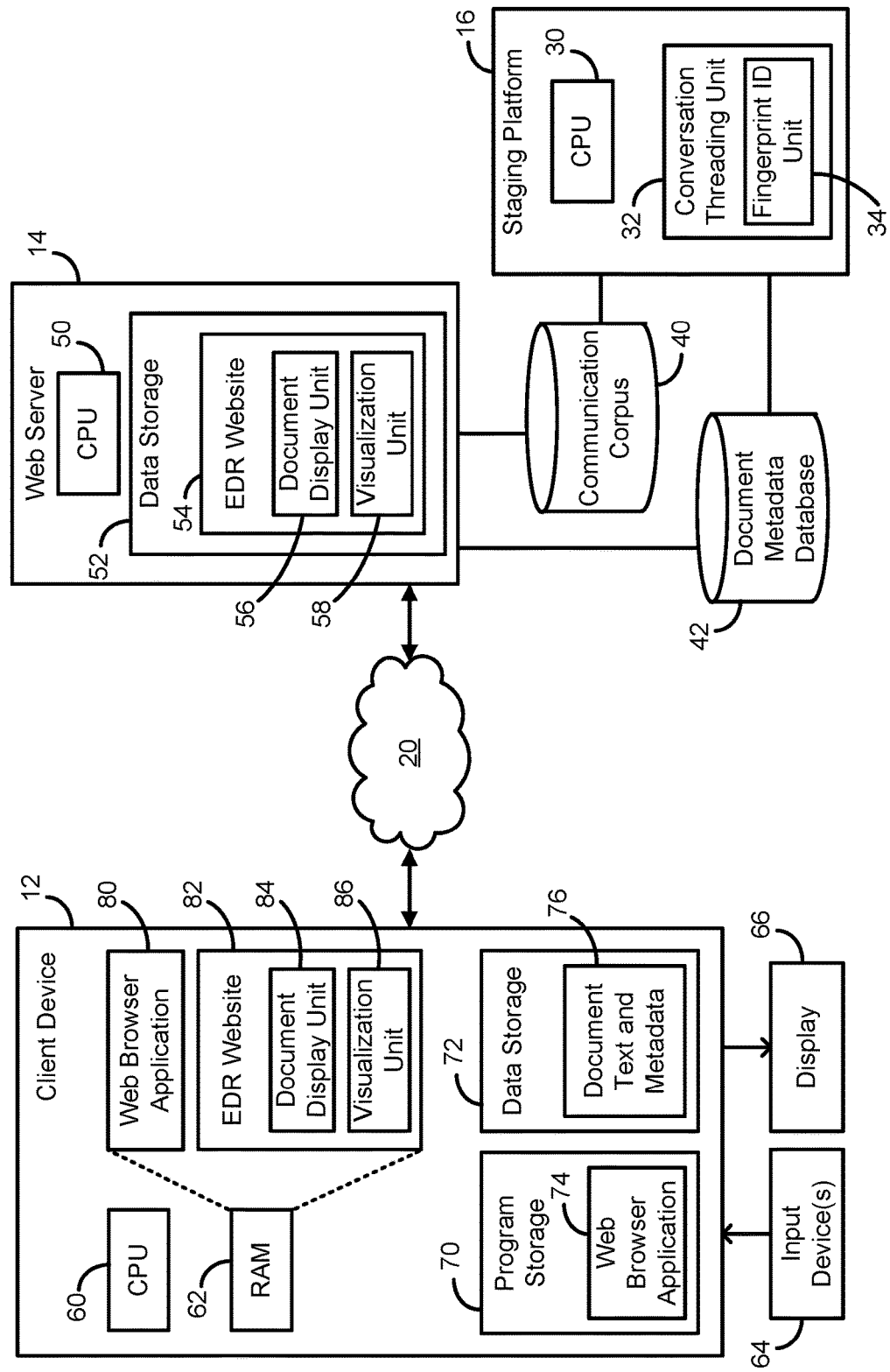
FIG. 1 depicts an example system in which techniques for facilitating a user's review of electronic communication documents may be implemented, according to one embodiment.

The embodiments described herein relate to, inter alia, the presentation of information regarding electronic communication documents (e.g., emails) to a user for review purposes. The systems and techniques described herein may be used, for example, in connection with electronic document review tools of the sort commonly used during litigation. However, other applications are also possible. For example, the systems and techniques described herein may be used by a company or other entity to categorize and/or review its own archived electronic communication documents (e.g., emails to and from customers, etc.), and/or for other purposes.

In some embodiments, an electronic communication document thread (e.g., email thread) or thread group is presented to a reviewing user as a visualization. Within the visualization, each electronic communication document (or each non-duplicate electronic communication document) of the thread or thread group may be represented by a different graphic element (e.g., a square or other shape, a number, a letter or word, an icon having the appearance of an envelope or other object, or any other type of element that can be displayed to a user). The relative position/arrangement of the graphic elements, and possibly also lines connecting various graphic elements, may visually and intuitively portray to the user the manner in which the conversation(s) unfolded. For example, between any two graphic elements that are directly connected by a line, the graphic element further to the left may represent the earlier of the two corresponding electronic communication documents. As another example, the visualization may branch into separate threads/branches each time that a first electronic communication document is directly followed by two or more electronic communication documents of different types. For instance, a "reply all" to a first email may be positioned in a first branch of the visualization, while a "forward" of the first email may be positioned in a second, parallel branch.

In some embodiments, each graphic element may be visually coded in order to provide additional, useful information to the reviewing user. For example, the appearance of each graphic element (e.g., the shape of the element, whether the element is shown as only an outline or with a filled interior, the color of the element, etc.) may depend on whether the corresponding electronic communication document is inclusive or non-inclusive, has duplicate copies within the electronic communication document corpus, has attachments, and so on. Additionally, or alternatively, the appearance of each graphic element may depend on a user tag or designation for the corresponding electronic communication document. If not already used to convey other types of information, for example, different colors may be used for graphic elements representing privileged or non-privileged documents, responsive or non-responsive documents, and so on.

In addition to providing content in an arrangement that enhances the user's understanding of the thread or thread group, the visualization may support various types of interaction with a user. In some embodiments, for example, the user may navigate among the documents represented by the graphic elements of the visualization. In such an embodiment, the user may select (e.g., touch or click on) a particular graphic element within the visualization to quickly navigate to the corresponding electronic communication document (e.g., to make the document appear in a document review area). As another example, the visualization may present more detailed information about a particular electronic communication document, and/or provide links to any attachments and/or duplicates associated with the document, if the user takes a particular action (e.g., moves a pointer or other type of cursor such that it "hovers" over the corresponding graphic element, or "right clicks" on the graphic element using a mouse, etc.).

By replacing conventional document review tools and techniques with one or more of the tools and techniques described herein, various advantages may be obtained. For example, a reviewing user may better and/or more quickly grasp the "story" of a particular conversation thread or thread group, and/or may more quickly ascertain which electronic communication documents within the thread or thread group are inclusive, have attachments, and/or are duplicates. As another example, a reviewing user may more easily and intuitively navigate between particular electronic communication documents of interest within a thread or thread group. As yet another example, a reviewing user may more easily identify specific instances of missing documents (e.g., if certain emails were not produced by an opposing party in litigation). As still another example, a reviewing user may more easily and accurately tag/designate/code electronic communication documents according to category (e.g., "privilege" or "no privilege," "responsive" or "not responsive," etc.), and/or improper designations may be more easily detected.

II. Example System for Facilitating User Review of Electronic Communication Documents FIG. 1 depicts an example system 10 in which techniques for facilitating a user's review of electronic communication documents may be implemented, according to one embodiment. As it is generally used herein, the term "electronic communication document" refers to an electronic document that represents an exchange (or a potential/planned exchange, as in the case of a draft email) between two or more individuals. However, the term can also (in some embodiments and/or scenarios) include emails and/or other documents that are addressed from an individual to himself or herself (e.g., an email sent from the individual's personal email account to his or her work email account). While many of the examples described herein refer specifically to email, it should be appreciated that the techniques described herein are applicable to other types of electronic communication documents. For example, some instant messaging applications may archive a conversation upon its conclusion. The electronic file that represents the instant messaging conversation may be considered an "electronic communication document." As another example, social media platforms may support their own form of messaging (e.g., a Facebook message, an Instagram direct message, etc.). These messages may also be considered an "electronic communication document." Furthermore, recent email platforms like Slack blend several types of electronic communications into a single conversation. Electronic files that underlie these types of email platforms may also be considered "electronic communication documents."

As seen in FIG. 1, the example system 10 includes a client device 12, a web server 14, and a staging platform 16. Client device 12 is communicatively coupled to web server 14 via a network 20. Network 20 may be a single communication network, or may include multiple communication networks of one or more types (e.g., one or more wired and/or wireless local area networks (LANs), and/or one or more wired and/or wireless wide area networks (WANs) such as the Internet). Web server 14 may be remote from or co-located with staging platform 16. Web server 14 and staging platform 16 may each be an individual server, or may each include a group of multiple servers. Alternatively, web server 14 and staging platform 16 may be combined in a single server.

Generally, web server 14 hosts web services relating to electronic document review, which may be accessed/utilized by client device 12, and staging platform 16 implements certain back-end operations (e.g., email threading) in support of the document review services provided to client device 12, as discussed in further detail below. While FIG. 1 shows only a single client device 12, it is understood that multiple different client devices (of different entities and/or users), each similar to client device 12, may be in remote communication with web server 14.

Staging platform 16 includes a processor 30. While referred to in the singular, processor 30 may include any suitable number of processors of one or more types (e.g., one or more central processing units (CPUs), etc.). Generally, processor 30 is configured to execute software instructions stored in one or more memories (e.g., stored in a persistent memory such as a hard drive or solid state memory) of staging platform 16.

One such set of software instructions includes a conversation threading unit 32. Conversation threading unit 32 is generally configured to process a large number of electronic communication documents (e.g., emails) in a communication corpus 40 to determine which documents are a part of a same thread and/or thread group, and generate metadata that indicates the relationships among the documents within a number of threads and/or thread groups. Communication corpus 40 may be stored in one or more persistent memories. In some embodiments, communication corpus 40 is stored in locations distributed across a large geographic area. In different embodiments, communication corpus 40 may store only electronic communication documents (e.g., emails), or may store both electronic communication documents and other types of documents (e.g., .doc and .pdf files, etc.).

As used herein, a "conversation thread" (or simply "thread") refers to an ordered sequence of electronic communication documents, starting at a first ("root") document and proceeding to a single, final document, with each successive document in the thread corresponding to a particular user action that was taken in connection with the immediately preceding document. Thus, for example, a single conversation thread may include an initial email, a "reply-all" to the initial email (i.e., a reply to the sender and all other recipients of the initial email), a forward of the "reply-all" email, and a reply to the forwarded email. A "conversation thread group" (or simply "thread group"), as used herein, refers to a group of threads that all have different endpoints (final documents), but share the same root electronic communication document. It is to be understood that references herein to a "thread group" may, in some instances (and if not otherwise indicated by the context of the usage), encompass the possibility of only a single thread.

The metadata generated by conversation threading unit 32 may, at least in part, be generated by a fingerprint identification unit 34. Fingerprint identification unit 34 is generally configured to generate identifiers ("fingerprint IDs") for electronic communication documents within communication corpus 40. Each fingerprint ID may be generated using information included in each of one or more segments of a particular electronic communication document. A "segment," as used herein, generally refers to the incremental content (e.g., header and body) added at each step of a communication chain/thread, not including any modifications that may have been made to earlier segments (e.g., by adding in-line responses to an earlier email in an email chain). Thus, for example, a root/first communication document generally includes only a single segment, a reply thereto generally includes exactly two segments, and so on, with each new reply or forward (or draft thereof) adding an additional segment. In at least some embodiments (e.g., for email documents), each step of the chain/thread will typically contain the new segment as well as every previous segment, such that a reader can reference earlier stages of the conversation by looking further down in the text of the current communication.

In some embodiments, fingerprint identification unit 34 generates a fingerprint ID for a particular electronic communication document by first generating unique (or nearly unique) identifiers for each segment within that document. The segment identifiers may be concatenated in the order of the segments to generate the fingerprint ID, for example. In some embodiments, each segment identifier is generated by applying a hash function or algorithm, such as a Merkle-Damgard algorithm (e.g., MD5, MD6, etc.), a Secure Hash Algorithm (e.g., SHA-2, SHA-3, or the variants thereof), SWIFFT, etc., to data included within the corresponding segment. For example, the hash function may be applied to a concatenation of data indicating the author and date (e.g., including time) of the segment. Alternatively, in order to generate fingerprint IDs that provide information about whether an earlier segment of a conversation has been modified (e.g., by adding in-line replies to an earlier message, etc.), the hash function may also, or instead, be applied to data representing some or all of the body of the corresponding segment. Generally, fingerprint IDs (also referred to simply as "fingerprints") may be generated according to any of the embodiments discussed in U.S. patent application Ser. No. 15/205,980, filed on Jul. 8, 2016 and entitled "System and Method for Fingerprinting-Based Conversation Threading," the disclosure of which is hereby incorporated herein by reference in its entirety.

The metadata generated by conversation threading unit 32 may be added to a document metadata database 42 that associates document identifiers with the fingerprint IDs and possibly other document-specific metadata. Database 42 may be stored in one or more persistent memories, and in some embodiments may be stored in the same memory as communication corpus 40. The metadata, including the fingerprint IDs, may be used by web server 14 and/or client device 12 to visually reconstruct a thread. For example, the fingerprint IDs may be used to determine which emails are parts of a single email chain, the order of those emails within the chain, which emails are inclusive emails, and so on. As the term is used herein, an "inclusive" electronic communication document is one that contains unique content (e.g., a new header and/or body, an attachment, etc.) that is not included in any other electronic communication document in the same thread group.

In some embodiments, conversation threading unit 32 is a part of a larger application or set of applications, which pre-processes electronic documents of all sorts for various purposes in addition to conversation threading. For example, such an application or application set may convert newly loaded electronic documents to a pdf format, assign identifiers/labels to newly loaded documents, implement textual and/or conceptual de-duplication of documents, and so on.

Web server 14 includes a processor 50. As with processor 30, processor 50 may include any suitable number of processors and/or processor types. Generally, processor 50 is configured to execute software instructions stored in one or more memories (e.g., stored in a persistent memory such as a hard drive or solid state memory) of web server 14.

Web server 14 includes a data storage 52 (e.g., one or more persistent memories) that stores one or more web pages of an electronic document review (EDR) website 54. EDR website 54 includes instructions of the web pages (e.g., HyperText Markup Language (HTML) instructions, JavaScript instructions, JavaServer Pages (JSP) instructions, and/or any other type of instructions suitable for defining the content and presentation of the web page(s)), and/or may include instructions of a plug-in, extension, and/or stand-alone software component that may be downloaded by client device 12. EDR website 54, or another application or unit of web server 14 that is not shown in FIG. 1, also includes instructions for communicating with communication corpus 40 and document metadata database 42 as needed to obtain or modify the data stored therein. In other embodiments, web server 14 accesses communication corpus 40 and document metadata database 42 only indirectly, such as through platform 16 (e.g., by sending requests for data to staging platform 16) or another server.

Generally, EDR website 54 provides users accessing EDR website 54 with a graphical user interface (GUI) that enables the users to review documents in communication corpus 40. To this end, EDR website 54 includes instructions of a document display unit 56 and a visualization unit 58. Generally, document display unit 56 enables a user to review the content of specific, selected documents, while visualization unit 58 enables the user to graphically portray conversation thread groups (each corresponding to a set of multiple documents), as discussed in further detail below. EDR website 54 may also include instructions configured to recognize various inputs from users, and to act accordingly (e.g., to download and/or display another document in response to the user selecting that document, and/or to save user tags/designations for documents to document metadata database 42, etc.).

Client device 12 may be a personal computing device of a user, such as a laptop or desktop computer, for example. Alternatively, client device 12 may be any other suitable type of computing device, such as a tablet, smartphone, etc. In the embodiment of FIG. 1, client device 12 includes a processor 60, a random-access memory (RAM) 62, one or more input devices 64, a display 66, a program storage 70, and a data storage 72. As with processors 30 and 50, processor 60 may include any suitable number of processors and/or processor types. Processor 60 may include one or more CPUs and one or more graphics processing units (GPUs), for example. Generally, processor 60 is configured to execute software instructions stored in program storage 70. Program storage 70 may include one or more persistent memories (e.g., a hard drive and/or solid state memory), and stores a number of applications including a web browser application 74. Data storage 72 may also include one or more persistent memories, and generally stores data used by applications stored in program storage 70. As discussed further below, data storage 72 can store document text and metadata 76 that has been downloaded from communication corpus 40 and document metadata database 42.

Input device(s) 64 may include components that are integral to client device 12, and/or exterior components that are communicatively coupled to client device 12, to enable client device 12 to accept inputs from the user. For example, input device(s) 64 may include a mouse, a keyboard, a trackball device, a microphone, etc. Display 66 may also be either integral or external to client device 12, and may use any suitable display technology (e.g., LED, OLED, LCD, etc.). In some embodiments, input device(s) 64 and display 66 are integrated, such as in a touchscreen display. Generally, input device(s) 64 and display 66 combine to enable a user to interact with GUIs provided by client device 12.

RAM 62 stores portions of the instructions and data stored by program storage 70 and data storage 72 when processor 60 executes applications stored in program storage 70. When CPU 60 executes web browser application 74, for example, RAM 62 may temporarily store the instructions and data required for its execution. In FIG. 1, web browser application 74 (while being executed) is represented in the program space of RAM 62 as web browser application 80. When the user of client device 12 uses web browser application 74 to access EDR website 54, any scripts or other instructions of EDR website 54 (e.g., instructions associated with document display unit 56 and visualization unit 58) may be stored as a local copy in RAM 62. FIG. 1 illustrates a scenario where EDR website 54 is stored in RAM 62 as EDR website 82, document display unit 56 is stored in RAM 62 as document display unit 84, and visualization unit 58 is stored in RAM 62 as visualization unit 86. Web browser application 80 may interpret the instructions of each of the local copies to present the page(s) of EDR website 54 to the user, and to handle user interactions with the page(s) as discussed further below. When various functions or actions are attributed herein to EDR website 82, document display unit 84, or visualization unit 86, it is understood that those actions may be viewed as being caused by the web server 14, by way of providing the instructions of EDR website 54, document display unit 56, or visualization unit 86, respectively, to client device 12 via network 20.

In operation, the user of client device 12, by operating input device(s) 64 and viewing display 66, opens web browser application 74 to access EDR website 54 for purposes of reviewing (and possibly designating categories or classifications of) electronic documents. To fully access EDR website 54, the user may be required to satisfy certain security measures, such as entering a valid login and password, for example. The user may then utilize a web page of EDR website 54 to indicate the project or workspace that he or she wishes to access. Web server 14 may use the indication of the project or workspace to identify the appropriate set of documents in communication corpus 40, or to identify the entirety of communication corpus 40 (e.g., if corpus 40 only includes electronic communication documents for a single project or workspace).

By the time the user of client device 12 accesses EDR website 54, the documents in communication corpus 40 may already have been pre-processed by staging platform 16. For example, conversation threading unit 32 of staging platform 16 may have previously identified which electronic communication documents belong to the same threads and thread groups, and may have generated fingerprint IDs for those documents and stored the fingerprint IDs in document metadata database 42.

In an embodiment, when the user of client device 12 selects a specific electronic communication document (e.g., from a list of document identifiers presented by EDR website 82, and each corresponding to a document in communication corpus 40), web server 14 retrieves the electronic communication document from communication corpus 40, and retrieves associated metadata from document metadata database 42. Web server 14 may transmit the document and metadata to client device 12, where document display unit 84 may cause the text (and possibly images) of the selected electronic communication document to be presented to the user via a GUI shown on display 66. Moreover, visualization unit 86 may utilize the associated metadata to determine how to portray, via the GUI, the visualization of the thread group (if any) that contains the selected electronic communication document. In other embodiments, web server 14 utilizes the associated metadata to determine how to portray the visualization.

In some embodiments, visualization unit 86 (or web server 14) only causes a visualization to be generated (and/or only causes a visualization pane, window, or other area to open on display 66) if the selected communication document is known, with some confidence, to be a part of a thread group. Thus, a visualization may not be shown if, for example, document metadata database 42 does not include a fingerprint ID for the selected electronic communication document. Specific examples of visualizations, according to one or more embodiments and a number of different scenarios, are shown in FIGS. 2, 4, 6, and 7 and discussed further below.

In some embodiments, visualization unit 86 detects when the user has selected (e.g., clicked on or tapped) a representation of a particular electronic communication document within the visualization, and in response causes document display unit 84 to show the text, etc., of the newly selected document in place of the old document. To allow the user to switch between documents more quickly (e.g., without annoying lags due to potential delays in network 20), web server 14 may send all electronic communication documents within the current thread group (and the associated metadata) to client device 12, for storage as document text and metadata 76, the first time a document in the thread group is selected by the user (or the first time the user attempts to visualize the thread group, etc.). If the user selects an electronic communication document outside the current thread group, however, client device 12 may still need to contact web server 14 to retrieve that document, the other documents in the new thread group, and the associated metadata. Web server 14 may send the new documents and metadata to client device 12 for storage as document text and metadata 76.

In some embodiments, the user can code the electronic communication documents according to certain predefined and/or user-created tags/designations, such as "privilege," "no privilege," "responsive," "not responsive," and so on. In some embodiments, each designation type (e.g., responsiveness) is associated with a set of values (e.g., "responsive," "not responsive," or "not set"). Depending on the embodiment, the user may be able to set or change these tags/designations for particular electronic communication documents while working in the document review area and/or the visualization area of the GUI. Examples of ways in which users may designate electronic communication documents via the visualization area of the GUI are discussed further below in connection with FIG. 7. In some embodiments, user changes to the designations for an electronic communication document are communicated to web server 14, which modifies the document designation appropriately (e.g., within document metadata database 42 or another location, depending upon where such data is stored). Web server 14 may directly modify the designation, or may request that another device or system (e.g., staging platform 16) do so.

While FIG. 1 shows an embodiment in which an electronic document review tool is provided as a web-based service, it is understood that other embodiments are also within the scope of the present invention. For example, program storage 70 of client device 12 may store a software product that enables client device 12 to interface directly with staging platform 16, without requiring web server 14. Alternatively, such a software product may enable client device 12 to implement the functions of staging platform 16 as well.

Moreover, the various components of system 10 may interoperate in a manner that is different than that described above, and/or system 10 may include additional components not shown in FIG. 1. For example, an additional platform/server may act as an interface between web server 14 and staging platform 16, and may perform various operations associated with providing threading and/or other services of staging platform 16 to web server 14 and/or other web servers.

III. Example Graphical User Interfaces for Presenting Thread Group Visualizations FIGS. 2, 4, 6, and 7 depict example graphical user interfaces (GUIs) that may be presented by client device 12 on display 66 while the user of client device 12 is accessing EDR website 54 (i.e., while processor 60 is executing instructions of EDR website 82). In each depicted GUI, the instructions of document display unit 84 are causing a specific email to be shown to the user, and the instructions of visualization unit 86 are causing a visualization of the entire thread group that includes that specific email to be shown to the user. The GUIs of FIGS. 2, 4, 6, and 7 may correspond to a single embodiment under four different scenarios (e.g., depending upon what actions the user has taken and/or other factors). Alternatively, the GUIs of FIGS. 2, 4, 6, and 7 may correspond to different embodiments (i.e., embodiments in which the visualization tool has different capabilities).

Figure 2:
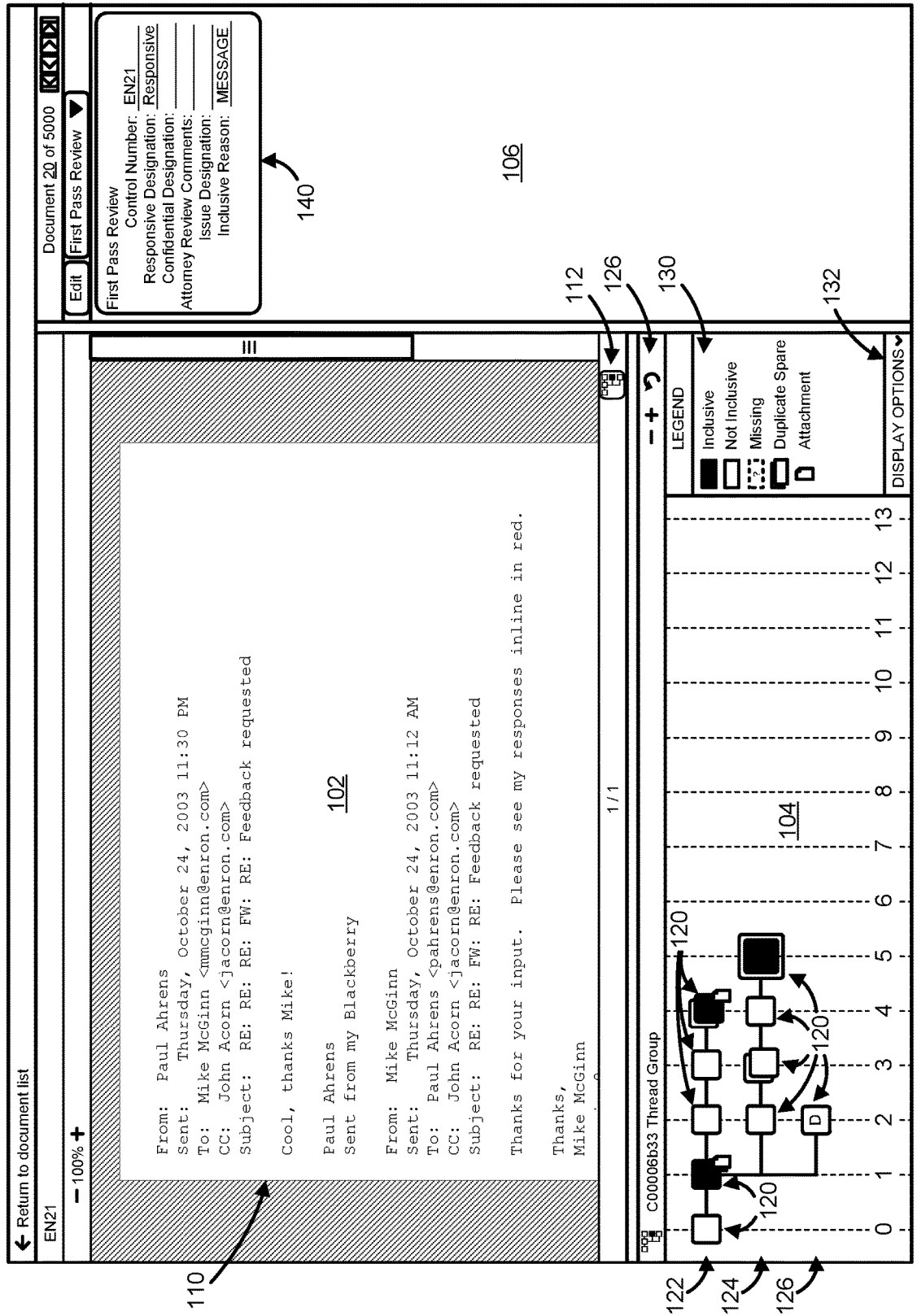
FIG. 2 depicts an example graphical user interface that may be presented by the client device of FIG. 1, according to one embodiment and scenario.

Referring first to FIG. 2, an example GUI 100 includes three different panes: a document review pane 102, a visualization pane 104, and a configurable pane 106. In some embodiments, the user can resize and/or swap the panes 102, 104, 106 to suit his or her preferences and current needs. In other embodiments, some or all of the panes 102, 104, 106 may instead be separate windows, and/or may not be presented to the user simultaneously.

Document review pane 102 displays the contents (e.g., text, and possibly graphics, etc.) of an email 110 that was most recently selected by the user (or possibly, in some embodiments and scenarios, selected by default). Document review pane 102 may include controls enabling the user to zoom in or out, scroll or pan, and so on. Document review pane 102 may also include a visualization icon 112 (or other type of user control, such as a right-click menu item, etc.). If activated/selected by the user while visualization pane 104 is not present, visualization icon 112 may cause visualization pane 104 to appear and show the entire thread group to which email 110 belongs. Thus, FIG. 2 may correspond to a time after which visualization icon 112 has already been activated by the user. In some embodiments, visualization icon 112 only appears in document review pane 102 if the document being reviewed (here, email 110) has been assigned a fingerprint ID by conversation threading unit 32, and/or if the document being reviewed is a part of a thread group with at least one other email.

Visualization pane 104 may display the entire thread group corresponding to the displayed email 110, at least to the extent that conversation threading unit 32 has been able to generate metadata (e.g., fingerprint IDs) that allows visualization unit 58 to accurately reconstruct that thread group. As seen in FIG. 2, visualization pane 104 includes, for this particular scenario, ten generally square-shaped graphic elements 120, each of which corresponds to a different one of ten emails in the thread group. In other embodiments, the graphic elements 120 may instead have other shapes, shadings, sizes, colors, etc.

The graphic elements 120 are distributed across the vertical and horizontal axes of the visualization, and are interconnected by lines, in a manner that portrays the ordered relationship among the different emails within the thread. Along the vertical axis, a top, first row 122 corresponds to a first thread within the thread group. A second row 124 corresponds to a second thread within the thread group or, more specifically, to the portion of the second thread that is not shared with the first thread. A third row 126 corresponds to a third thread within the thread group or, more specifically, to the portion of the third thread that is not shared with the first and second threads. Generally, depending on the number of threads in the visualized thread group, the visualization pane 104 may populate one or more rows.

The series of vertical, dashed lines evenly distributed along the horizontal axis of the visualization in FIG. 2 correspond to what are referred to herein as "levels of indentation." The numbers indicating the levels of indentation may or may not actually be shown in visualization display 104, depending on the embodiment. Each successive level of indentation (going from left to right in FIG. 2) corresponds to a next segment of the conversation. Thus, the left-most graphic element 120 (i.e., at indentation level 0 of row 122) corresponds to the first (root) email of the entire thread group. The graphic element 120 at indentation level 1 of row 122 may then represent an email that is a reply to (or forward of) the root email. Similarly, the graphic element 120 at indentation level 2 of row 122 may represent an email that is a reply to (or forward of) the email represented by the graphic element 120 at indentation level 1 of row 122, and so on.

More generally, within any single thread, graphic elements 120 that are at higher levels of indentation represent emails that were sent (or saved as drafts) later than emails represented by graphic elements 120 that are at lower levels of indentation. However, the levels of indentation may not represent any fixed amount of time. In one scenario, for example, the graphic elements 120 at indentation levels 1 and 2 of row 122 represent emails that were sent one minute apart, while the graphic elements 120 at indentation levels 2 and 3 of row 122 represent emails that were sent two weeks apart. Moreover, in some embodiments, the relative timing between emails of different threads in the thread group may not always be represented by the visualization. For example, in some scenarios, the graphic elements 120 at indentation levels 3 and/or 4 of row 122 may represent emails that were sent before the email represented by the graphic element 120 at indentation level 2 of row 124.

In alternative embodiments, the visualization of FIG. 2 is portrayed in a different manner, and/or with different kinds of information. For example, the axes of the visualization may be reversed (e.g., levels of indentation may be spaced vertically). As another example, the visualization may provide more information regarding the time relation between various emails within a single thread, and/or the time relation between emails of different threads. For instance, the graphic elements 120 may be horizontally spaced not with a fixed spacing, but rather with an inter-element spacing that represents the time between emails (e.g., with a scroll bar and/or panning capability to allow the user to view the full visualization, and/or with a log scale time axis, etc.), or with the lines between graphic elements 120 being visually coded (e.g., by color) to provide approximate information about the length of time between the corresponding emails, etc. As another example, each of the graphic elements 120 may show a number that corresponds to the time order of the corresponding email relative to all other emails represented in the visualization.

As seen in FIG. 2, the visualization of the current thread group branches from a single line/thread into three separate lines/threads after the second email. Branching points in the visualization may correspond to points at which one or more individuals responded to or acted upon the same email in different ways. For example, the graphic element 120 at indentation level 2 of row 122 may represent an email that is a reply-all to the second email (i.e., the email represented by the graphic element 120 at indentation level 1 of row 122), the graphic element 120 at indentation level 2 of row 124 may represent an email that is a forward of the second email, and the graphic element 120 at indentation level 2 of row 126 may represent an email that is a saved draft reply to (or draft forward of) the second email.

In some embodiments, a predetermined hierarchy or priority list determines which threads are displayed in which rows/branches. For example, at a given branching point, a reply-all message may be assigned to (i.e., displayed within) a higher row than other reply messages, reply messages of any sort may be assigned to a higher row than forwards, and forwards may be assigned to a higher row than drafts. In other embodiments, row assignments at branching points are determined on a different basis, such as putting the longest thread in the top row, or using more complex algorithms to maintain maximum clarity of the visualization.

In some embodiments, the graphic element 120 corresponding to the root email is not necessarily in the top row. For example, branches of the visualization may go up and/or down depending upon certain criteria that are intended to avoid collisions between different graphic elements 120. In one such embodiment, the default approach, while the visualization is first being generated, is for the graphic elements 120 of each new branch to populate a new row that is directly below the graphic element 120 that immediately preceded the branching point. If two new branches stem from the same graphic element 120, two corresponding rows may be populated below the preceding graphic element 120, and so on. When such an approach would result in two overlapping graphic elements 120, however, one or more rows may instead be shifted to a position above the row of the root email. Referring to the scenario of FIG. 2, for example, a collision would occur if a branch in the conversation occurred immediately after the graphic element 120 positioned at indentation level 3 of row 122. Thus, the graphic elements 120 shown in row 124 may instead be placed in a new row that is above the graphic element 120 for the root email (and row 126 may instead be placed in the position of row 124). Alternatively, other schemes or criteria may be used to avoid or handle collisions (e.g., by using special graphic elements that represent two emails of two different threads, etc.).

In some embodiments, the visualization zoom level or scaling may be automatically adjusted in the vertical direction based on the number of rows/threads in the thread group, and/or may be automatically adjusted in the horizontal direction based on the number of indentation levels needed to fully represent the thread group. In addition, or alternatively, the visualization may provide various controls 126 (e.g., zooming, scrolling, and/or panning controls) to the user (e.g., if the visualization does not automatically scale or zoom, or if the visualization has a minimum zoom level or minimum graphic element size, etc.).

In the embodiment of FIG. 2, each graphic element 120 is visually coded to provide additional, useful information to the reviewing user, as indicated by a legend 130. As seen in legend 130, a filled-in graphic element 120 denotes an inclusive email, an outlined graphic element 120 denotes a non-inclusive email, a graphic element 120 with a dashed outline and a question mark denotes a missing email, a graphic element 120 showing a stack of two squares denotes an email for which one or more duplicates exist (e.g., in communication corpus 40), and a graphic element 120 showing a dog-eared paper in one corner denotes an email having an attachment. Multiple attachments may be represented by a stack of multiple papers in the corner of the graphic element 120 (e.g., as is the case for the graphic element 120 at indentation level 1 of row 122 in the scenario of FIG. 2). In some embodiments, legend 130 also shows the count of each type of email within the thread group that is being visualized. For example, legend 130 may show the number "2" next to the words "Duplicate Spare" to indicate that two of the emails represented by graphic elements 120 have duplicates. Legend 130 may also, or instead, include one or more controls that enable the user to toggle the visibility of some types of emails (e.g., enable the user to control whether missing emails are shown or hidden), and/or may include one or more controls that enable the user to quickly select all emails of a given type by selecting that type within legend 130 (e.g., the legend items within legend 130 may be user-selectable items that, if activated by the user, cause all graphic elements 120 corresponding to the selected legend item to be selected for editing purposes, as discussed further below).

In some embodiments, two or more visual codes may be used for a single graphic element 120, as is seen for various graphic elements 120 in FIG. 2 (e.g., at indentation levels 1 and 4 of row 122). Moreover, some aspects of the visual coding may not be represented in legend 130. In FIG. 2, for example, the graphic element 120 at indentation level 2 of row 126 is marked with a "D" to denote that the corresponding email is a saved draft email.

In an alternative embodiment not reflected in GUI 100 of FIG. 2, all of the graphic elements 120, or the lines connecting the graphic elements 120, are visually coded to indicate the type of user-selected action that is associated with each email (e.g., whether the email is a reply-all, a reply that is not a reply-all, a forward, or a draft). For example, each line between two graphic elements 120 may be color-coded, or depict a particular graphic, etc., in a way that indicates the user-selected action, and/or each graphic element 120 may itself indicate the user-selected action (e.g., a back arrow to indicate a "reply," multiple back arrows to indicate a "reply-all," etc.).

In some embodiments, an indication of the email corresponding to the document currently being displayed in document review pane 102 (here, email 110) is also visually coded. In the embodiment of FIG. 2, for example, the graphic element 120 at indentation level 5 of row 124 represents email 110, and therefore is both slightly enlarged compared to the other graphic elements 120, and encased by the outline of a larger square. Other indications of the graphic element 120 corresponding to email 110 are also possible, such as a flashing effect, a color, a heavier shading, and so on.

In some embodiments, the user may navigate to new emails (i.e., cause new emails to be displayed in document review pane 102) simply by selecting (e.g., left-clicking with a mouse, or tapping with a finger, etc.) the corresponding graphic element 120 in the visualization pane 104. If, for example, the user clicks on or taps the graphic element 120 at indentation level 2 of row 124, visualization unit 86 may detect the selection and instruct document display unit 84 to display the corresponding email in document review pane 102 in place of the current email 110. The newly selected graphic element 120 may then become slightly enlarged and encased by a larger square outline, and the previously selected graphic element 120 may change to an "ordinary" appearance (e.g., a square that is generally of the same size as most of the other graphic elements 120, and without the larger square outline).

In some embodiments, the visual coding used for graphic elements 120 may not only provide types of information that are similar to those shown in legend 130 of FIG. 2, but also (or instead) may provide the reviewing user with information about how (and/or whether) each email in the thread group has been designated or tagged with a particular value. Such an approach may allow a user to easily spot documents that have likely been improperly tagged (e.g., where an entire email thread is designated "privilege," except for one email in the middle of the thread that is designated "not privileged"), and/or documents that still need to be tagged.

In some embodiments, the visualization only visually codes (e.g., only color-codes) according to tag or designation value if the user first activates a particular control. In the embodiment of FIG. 2, for example, the user may cause graphic elements 120 to be color-coded according to values of a particular tag or designation type (e.g., responsiveness values, or privilege values, etc.) by first selecting a particular menu item within a control 132. Thereafter, legend 130 may expand or otherwise change to include the colors that indicate all tag/designation values available for that tag/designation type or, alternatively, to include only those colors that indicate a value that has previously been applied to at least one email in the thread group. In various embodiments, legend 130 may also continue to show categories of the sort shown in FIG. 2 (e.g., "inclusive," "not inclusive," etc.), or may remove those categories. In either case, however, the graphic elements 120 themselves may continue to depict whether each email is inclusive, has duplicates, etc., but with the layer of color coding added to depict the tag/designation values.

As a more specific example, the user may select control 132, and be presented with a drop-down list of menu items that include "responsiveness," "privilege," "issues," and/or other designation types. If the user selects "responsiveness," EDR website 82 may use the metadata in document text and metadata 76 to determine which designation values for "responsiveness" have, to that point in time, been applied to any email(s) in the current thread group. The designation values for "responsiveness" may be "responsive," "not responsive," and "not set," for example. If all three values have been used, legend 130 may show those three values along with the corresponding colors (e.g., green for "responsive," yellow for "not responsive," and black for "not set"), and the graphic elements 120 may be color-coded accordingly.

In embodiments where tags/designation values are color coded, EDR website 82 or web server 14 may assign colors to the different values of a particular type of tag/designation in different ways. In one embodiment, for each new thread group that is visualized, colors are assigned only for those designation values that have already been used/applied within that thread group, and in a particular order (e.g., by name of designation value, in alphabetical order). For example, a first thread group may have documents tagged as "responsive," but no documents tagged as "not responsive," while a second thread group may have both documents tagged as "responsive" and documents tagged as "not responsive." In this scenario, if applying colors by alphabetical order, the color blue may be assigned to the "responsive" value in the first thread (because it is the first value by alphabet), but instead assigned to the "not responsive" value in the second thread (again, because it is the first value by alphabet).

Such an approach may confuse the user, however, as he or she views different thread groups within visualization pane 104. To avoid this possibility, a different approach may be used. Each time that a particular color is assigned to a particular tag/designation value (e.g., by taking the next available color on a predetermined list of colors), that assignment may be stored in a color map associated with that tag/designation type. When a visualization of a new thread group is opened (or when the user activates control 132 of GUI 100 to select a particular designation type for a new thread group, etc.), client device 12 or web server 14 may determine which tag/designation values have been applied to emails in that thread group. Client device 12 or web server 14 may also check the appropriate color map to see whether those in-use tag/designation values have already been assigned a color. Any previously assigned colors may then be applied to graphic elements in the visualization. If any tag/designation values used in the new thread group do not yet have a color assignment, the next available color (e.g., the next color on the predetermined list of colors) may be assigned to that tag/destination value, and stored in the color map to ensure that visualizations of other thread groups use the same color assignment. In some embodiments, in order to support more tag/designation values (or otherwise provide more flexibility), multiple colors are assigned to each tag/designation value (e.g., both a foreground color and a background color).

Configurable pane 106 is configurable by the user, or an administrator, to display certain types of information about the currently-selected document (here, email 110). As seen in FIG. 2, for example, an area 140 in configurable pane 106 may show an identification/control number of email 110, a user designation of email 110, and/or other information. In alternative embodiments, area 140 shows more, less, and/or different types of information, configurable pane 106 includes other areas similar to area 140 (or no such areas), or configurable pane 106 is omitted entirely from GUI 100.

In some embodiments, GUI 100 provides user controls (not shown in FIG. 2) for initiating different modes of GUI 100. For example, GUI 100 may provide controls for opening a "stand-alone" version of document review pane 102. The stand-alone version of document review pane 102 may be a new browser window, for example. The stand-alone version of document review pane 102 may have both a "synced mode" and an "unsynced mode." In unsynced mode, if the user navigates to a different email within visualization pane 104 (by selecting a different one of graphic elements 120), that email may be displayed in document review pane 102, but not the stand-alone document review window. In synced mode, however, the document review pane 102 and the stand-alone document review window are synchronized, with both showing the email to which the user most recently navigated within visualization pane 104.

Additionally, or alternatively, GUI 100 may provide controls for opening an "undocked" version of document review pane 102. The undocked document review pane 102 may generally stay synchronized to navigation operations of the user in visualization pane 104. The undocked viewer may primarily be intended to give the user additional onscreen real-estate, while the stand-alone viewer may primarily be intended to let the user keep a key document onscreen while he or she navigates through other emails in the visualization pane 104, for example.

As noted above, the visualization shown in visualization pane 104 may be generated using metadata, such as fingerprint IDs, that are stored in database 42 and/or data storage 72. FIG. 3 depicts an example set of associations 150 between email documents 152 and fingerprint IDs 154 that may be used to generate the visualization shown in visualization pane 104 of FIG. 2, according to one embodiment. The associations 150 may be stored in a relational database, for example.

Each of email documents 152 corresponds to a different one of graphic elements 120 in FIG. 2, and thus to a different email within the thread group. Email documents 152 are identified in FIG. 3 using the format Lx-Ry, with x representing the indentation level and y representing the row number (with top row 122 corresponding to "1," middle row 124 corresponding to "2," and bottom row 126 corresponding to "3"). Fingerprint IDs 154 are represented in FIG. 3 as a series of letters separated by dashes, with each individual letter representing the value of a hash of information in a different segment of the respective email document (as discussed above in connection with conversation threading unit 32 of FIG. 2). It is understood that actual hash values may be much longer (e.g., four hexadecimal numbers per segment hash value, or 20 binary numbers per segment hash value, etc.).

The limited set of email documents 152 shown in FIG. 3 assumes that the document set has already been narrowed down to those in the same thread group (minus any duplicates). This may have been determined by determining that all of email documents 152 have fingerprint IDs 154 that begin with the same segment hash value (A). Visualization unit 86 or web server 14 may also use fingerprint IDs 154 to determine the order and thread branching of email documents 152 within the thread group. In particular, the order and thread branching may be determined by comparing the sequence of hash values for commonality. Referring to FIG. 3, for example, visualization unit 86 or web server 14 may determine that the email L0-R1 is the root email of the thread group because it only has the single segment A, and determine that the email L1-R1 is a next email in the thread group (i.e., is at the next indentation level, 1) because it includes the root email hash value (A) followed by one, and only one, additional hash value (B). Thus, the email L1-R1 may be displayed immediately to the right of email L0-R1.

Continuing on, visualization unit 86 or web server 14 may determine that each of emails L2-R1, L2-R2, and L2-R3 are the next emails in the thread group (i.e., are all at the next indentation level, 2) because each includes the root email hash value (A), followed by the hash value that is now known to correspond to the next email (B), followed by one, and only one, additional hash value (C, M, or X). Because there is more than one "next" email in this instance, the visualization includes a branching point, with one branch/row/thread for each of the three "next" emails. As noted above, various techniques may be applied to determine which of the three "next" emails is shown in which row.

Visualization unit 86 or web server 14 may then determine that email L3-R1 is a next email in the thread containing the email L2-R1, because it includes the same hash value sequence (A-B-C), followed by one, and only one, additional hash value (D). Similarly, visualization unit 86 or web server 14 may determine that email L3-R2 is a next email in the thread containing the email L2-R2, because it includes the same hash value sequence (A-B-M), followed by one, and only one, additional hash value (N).

Continuing still further, visualization unit 86 or web server 14 may determine that email L4-R1 is a next email in the thread containing the email L3-R1, because it includes the same hash value sequence (A-B-C-D), followed by one, and only one, additional hash value (E), and that email L4-R2 is a next email in the thread containing the email L3-R2, because it includes the same hash value sequence (A-B-M-N), followed by one, and only one, additional hash value (O). Finally, visualization unit 86 or web server 14 may determine that email L5-R2 is a next email in the thread containing the email L4-R2, because it includes the same hash value sequence (A-B-M-N-O), followed by one, and only one, additional hash value (P).

Visualization unit 86 or web server 14 may also determine other information about email documents 152 based on both fingerprint IDs 154 and metadata relating to the attachments to email documents 152. For example, comparisons of fingerprint IDs 154 can indicate which of email documents 152 are inclusive. In particular, an email may be deemed inclusive if it contains at least one segment hash value that is not also included in any other segment hash value in the thread group. Referring to FIG. 3, therefore, emails L2-R3 (the only email with segment hash value X), L4-R1 (the only email with segment hash value E), and L5-R2 (the only email with segment hash value P) would be deemed inclusive. Note that in the embodiment of FIG. 2, draft emails are treated as a special case, and simply marked with a "D" rather than having a solid fill as is the case with other inclusive emails. The metadata providing information about email attachments may also be used to determine inclusiveness. In particular, an email may be deemed to be inclusive, regardless of whether the email itself has any unique segment hash values, if the email has at least one attachment that is not included in any other email in the thread group.

FIG. 4 depicts an example GUI 200 in a scenario that is similar to that of FIG. 2, but where visualization unit 86 or web server 14 determines that one email in the thread group is missing. In FIG. 4, reference numbers 202, 204, 206, 210, 212, 220, 222, 224, 226, 230, 232, and 240 may be the same as or similar to reference numbers 102, 104, 106, 110, 112, 120, 122, 124, 126, 130, 132, and 140 in GUI 100 of FIG. 2. Some of the reference numbers and arrows corresponding to graphic elements 220 are removed for clarity.

As seen in FIG. 4, the graphic element 220 located at indentation level 1 of row 222 is visually coded as a "missing" email. Graphic elements 220 for missing emails may not only have a different border, text, etc. (here, a dashed border and question mark), but may also be grayed out relative to other graphic elements 220. Visualization unit 86 or web server 14 may determine that an email is missing, at that particular position in the thread group, based on the fingerprint IDs of the emails in the thread group. FIG. 5 depicts an example set of associations 250 between email documents 252 and fingerprint IDs 254 that may be used to generate the visualization shown in visualization pane 204 of FIG. 4, according to one embodiment.

As was the case with the set of associations 150 shown in FIG. 3, visualization unit 86 or web server 14 may determine that the email L0-R1 is the root email of the thread group because it only has the single segment A. In this scenario, however, visualization unit 86 or web server 14 may determine that an email is missing in the thread because no other email in communication corpus 40 includes the root email segment hash value (A) followed by one, and only one, additional segment hash value. Because there is at least one email that includes the root email hash value (A) and exactly two additional segment hash values (in this case, three such emails), visualization unit 86 or web server 14 may determine that only one email is missing from communication corpus 40, and cause a graphic element 220 that is visually coded as "missing" to be inserted in the visualization immediately after the root email.

Thus, "missing" emails in a given thread may generally be identified by incrementally adding each "next" email in the thread until a point is reached where no "next" email (i.e., no email with segment hash values that exactly match the last email added to the thread, plus exactly one additional segment hash value) can be found. If no other emails contain the segment hash value sequence up to that point, the visualization may portray the thread as having terminated. However, if one or more emails do contain that segment hash value sequence, plus N additional segment hash values (where N is greater than 1), the visualization may portray the thread as having N−1 missing emails.

In some embodiments where certain emails may be "secured" (e.g., have restricted access, as set up by an administrator or other user), the visualization may depict secured emails in the same manner as missing emails (e.g., with a dashed border and question mark), such that a reviewing user may be entirely unaware that those emails are secured. Additionally, if an entire branch (thread portion) of an email is secured, the visualization may not include any graphic elements, or other indicators, for that branch at all, and the user may be entirely unaware of the existence of that branch.

Figure 6:
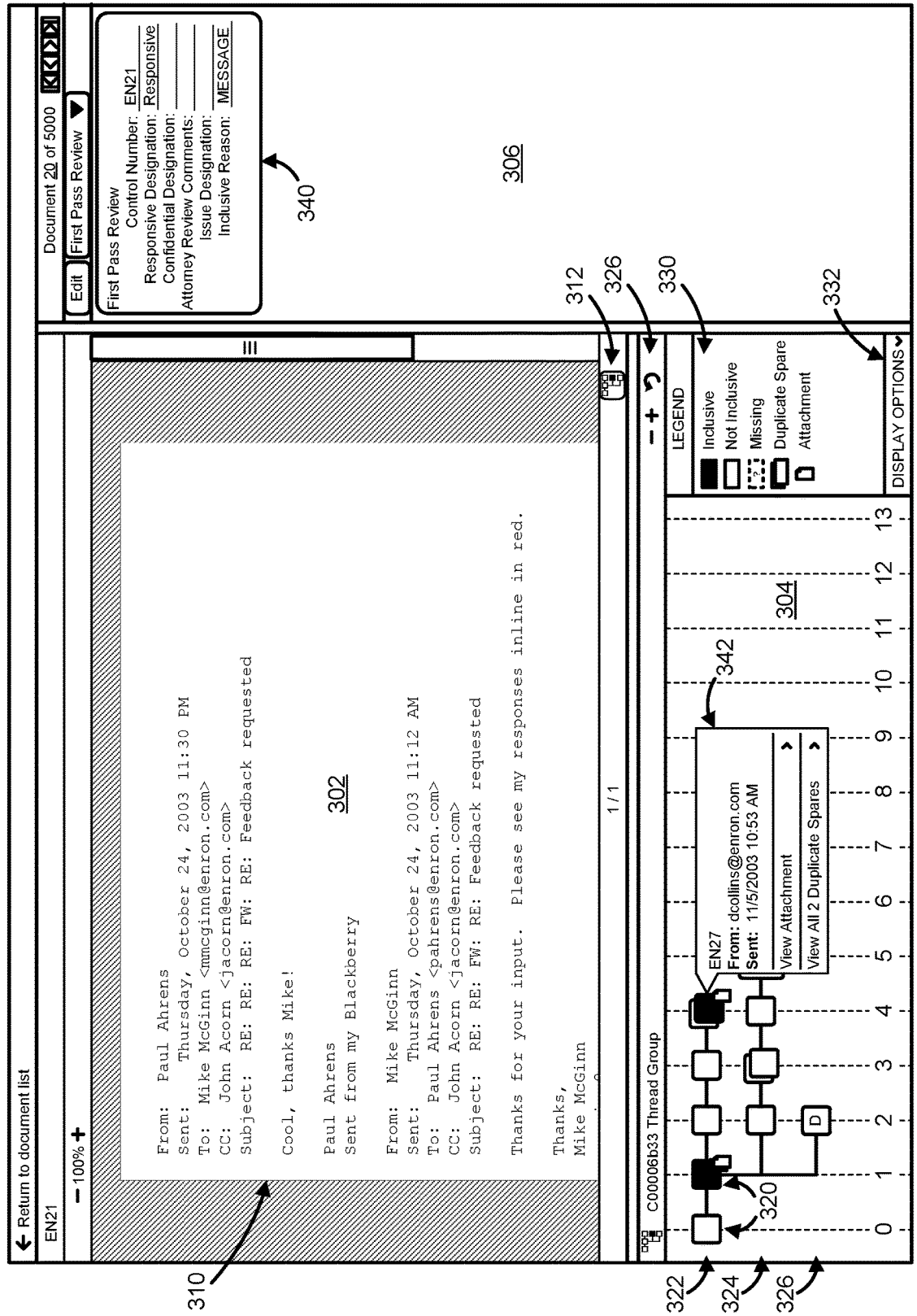
FIG. 6 depicts an example graphical user interface in which the user causes additional information and links relating to a specific email to be presented within the visualization, according to one embodiment and/or scenario.

FIG. 6 depicts an example GUI 300 in a scenario that is similar to that of FIG. 2, but where the user has taken an action that causes additional information about a particular email to be displayed. In FIG. 6, reference numbers 302, 304, 306, 310, 312, 320, 322, 324, 326, 330, 332, and 340 may be the same as or similar to reference numbers 102, 104, 106, 110, 112, 120, 122, 124, 126, 130, 132, and 140 in GUI 100 of FIG. 2. Some of the reference numbers and arrows corresponding to graphic elements 320 are removed for clarity.

As seen in FIG. 6, visualization pane 304 of GUI 300 includes an object or "tooltip" 342, which provides various pieces of information about the email at indentation level 4 of row 322, as well as various links. Tooltip 342 may appear in response to visualization unit 86 detecting that the user moved the cursor (e.g., mouse pointer) to hover over the graphic element representing the email, for example, or based on a different user trigger (e.g., the user doing a "right click" with a mouse while the cursor is hovering over the graphic element, or double tapping the graphic element with his or her finger, etc.). The tooltip 342 may disappear if the user moves the cursor such that it no longer hovers over the graphic element.

In the embodiment shown, tooltip 342 includes an identifier of the email ("EN27"), the author of the email (dcollins@enron.com), and the date and time when the email was sent ("11/5/2003 10:53 AM"). In other embodiments, tooltip 342 may include more, less, and/or different information about the email. Tooltip 342 also includes a link to the attachments to the email (in this case, just one attachment), and a link to the duplicates of the email that exist in communication corpus 40 (in this case, two duplicates). In other embodiments, tooltip 342 may include more, fewer, and/or different types of links.

If visualization unit 86 detects a user selection of (e.g., "left click" on) the attachment link, the attachment may appear in document review pane 302. If visualization unit 86 detects a user selection of the duplicate link, a list of the duplicate email documents may be presented. When the user selects a particular duplicate, configuration pane 306 may display information about the selected duplicate document, and/or document review pane 302 may display the selected duplicate document.

Figure 7:
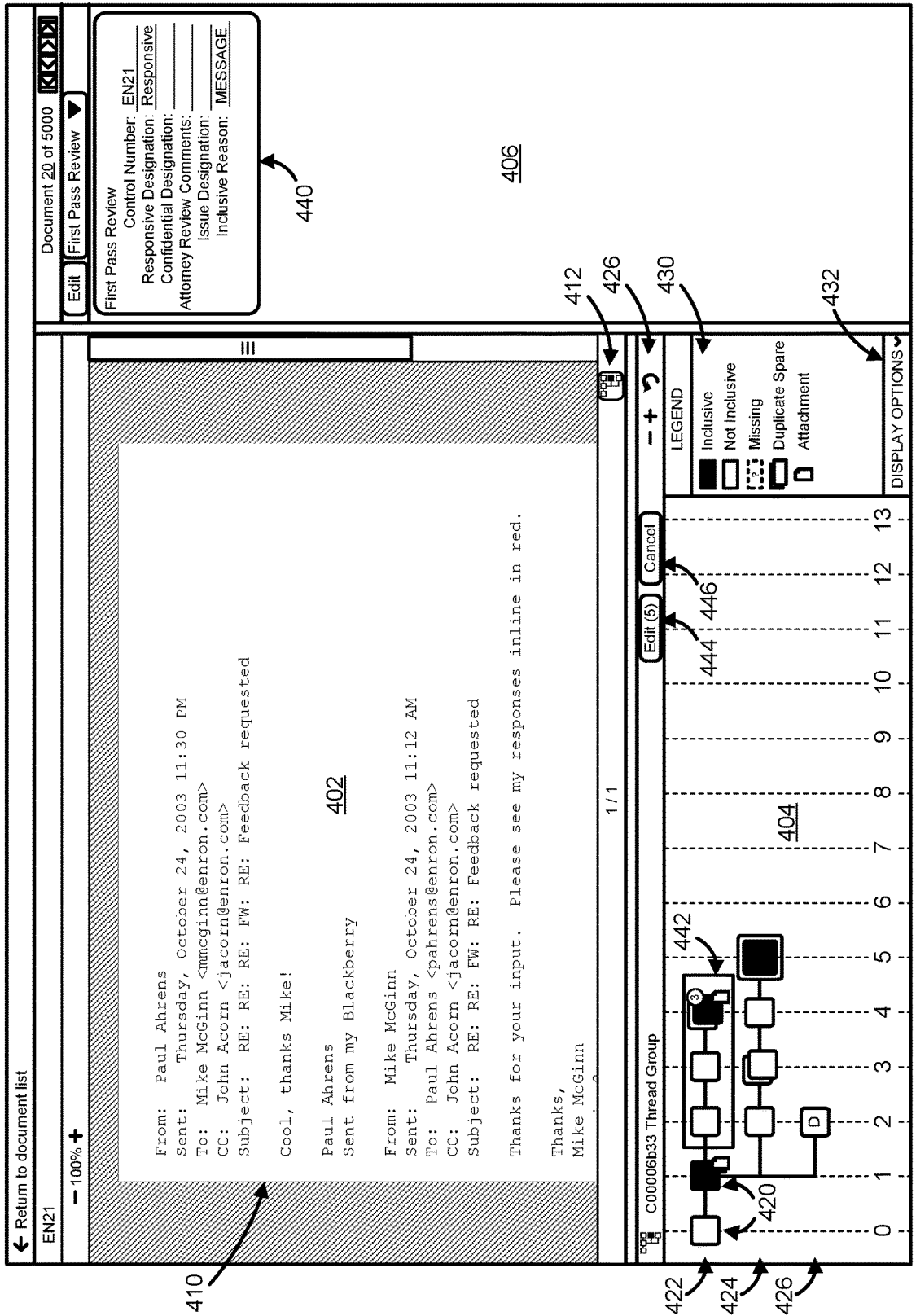
FIG. 7 depicts an example graphical user interface in which the user selects a subset of emails within the visualization for editing, according to one embodiment and/or scenario.

FIG. 7 depicts an example GUI 400 in a scenario that is similar to that of FIG. 2, but where the user has taken an action to select certain email documents. In FIG. 7, reference numbers 402, 404, 406, 410, 412, 420, 422, 424, 426, 430, 432, and 440 may be the same as or similar to reference numbers 102, 104, 106, 110, 112, 120, 122, 124, 126, 130, 132, and 140 in GUI 100 of FIG. 2. Some of the reference numbers and arrows corresponding to graphic elements 420 are removed for clarity.

As seen in FIG. 7, visualization unit 86 has caused a polygon 442 to surround three user-selected graphic elements 420. The user may have selected those graphic elements 420 in various ways, according to different embodiments. For example, the user may select graphic elements 420 by holding the control key while left-clicking on each graphic element 420 that is being selected. As another example, the user may left-click on a first graphic element 420 in a thread, and then hold the shift key while left-clicking on a second graphic element 420 in the same thread, to automatically select those two graphic elements 420 plus all graphic elements 420 that are between them in the thread. The polygon 442 may assume a non-rectangular shape if the selected graphic elements 420 includes graphic elements 420 in different rows, or may include multiple polygons if the selected graphic elements 420 are not all adjacent. In some embodiments, other types of indicators are used to show which graphic elements 420 have been selected, rather than (or in addition to) polygons. For example, selected graphic elements 420 may appear as they normally do, but unselected graphic elements 420 may be "grayed out" or faded.

In some embodiments, when the user selects any individual graphic element 420 that is associated with two or more documents in communication corpus 40, the graphic element 420 is modified to depict a number indicating the total number of associated documents (e.g., to indicate that all of the associated documents, and not only the email itself, have been selected). In the example embodiment and scenario of FIG. 7, for example, the graphic element 420 at indentation level 4 of row 422 is modified to show the number "3," thereby indicating that the email, the duplicate email, and the single attachment are all simultaneously selected.

A control 444 in visualization pane 404 (e.g., a virtual button) enables the user to edit characteristics of the emails represented by the selected graphic elements 420, and possibly also edit characteristics of any other documents (e.g., duplicates, attachments) associated with those emails. In the example embodiment of FIG. 7, control 444 shows the total number of documents that are currently selected, and that will be edited by any changes the user makes via control 444. Another control 446 in visualization pane 404 (e.g., another virtual button) allows the user to unselect all selected graphic elements 420, thereby causing visualization pane 404 to return to a state similar to that shown in FIG. 2.

When a user activates control 444 after selecting one or more graphic elements 420, visualization unit 86 may present in GUI 400 (or in a new window, etc.) an interface that allows the user to code or tag the email(s) corresponding to the selected graphic element(s) 420. For example, the interface may enable the user to designate the emails as "privilege," "not privilege," "responsive," "non-responsive," and/or according to one or more other designations (e.g., system default designations and/or user-created designations). In this manner, the user may efficiently tag/designate emails within the thread group.

In some embodiments, the user inputs that cause a particular email of the visualized thread group to appear in document review pane 402 are different than the user inputs that cause a graphic element 420 to be selected for editing purposes. For example, the visualization pane 104 may include one or more controls (not shown in FIG. 7) that enable the user to toggle between a "navigation" mode (for picking specific documents to review in document review pane 102) and a "selection" or "edit" mode (for applying or changing user designations of specific documents).

IV. Example Methods for Facilitating User Review of Electronic Communication Documents FIGS. 8 and 9 illustrate example methods for facilitating user review of emails or other electronic communication documents, with FIG. 8 representing a server perspective (e.g., staging platform 16 and/or web server 14) and FIG. 9 representing a client perspective (e.g., client device 12 of FIG. 1).

Figure 8:
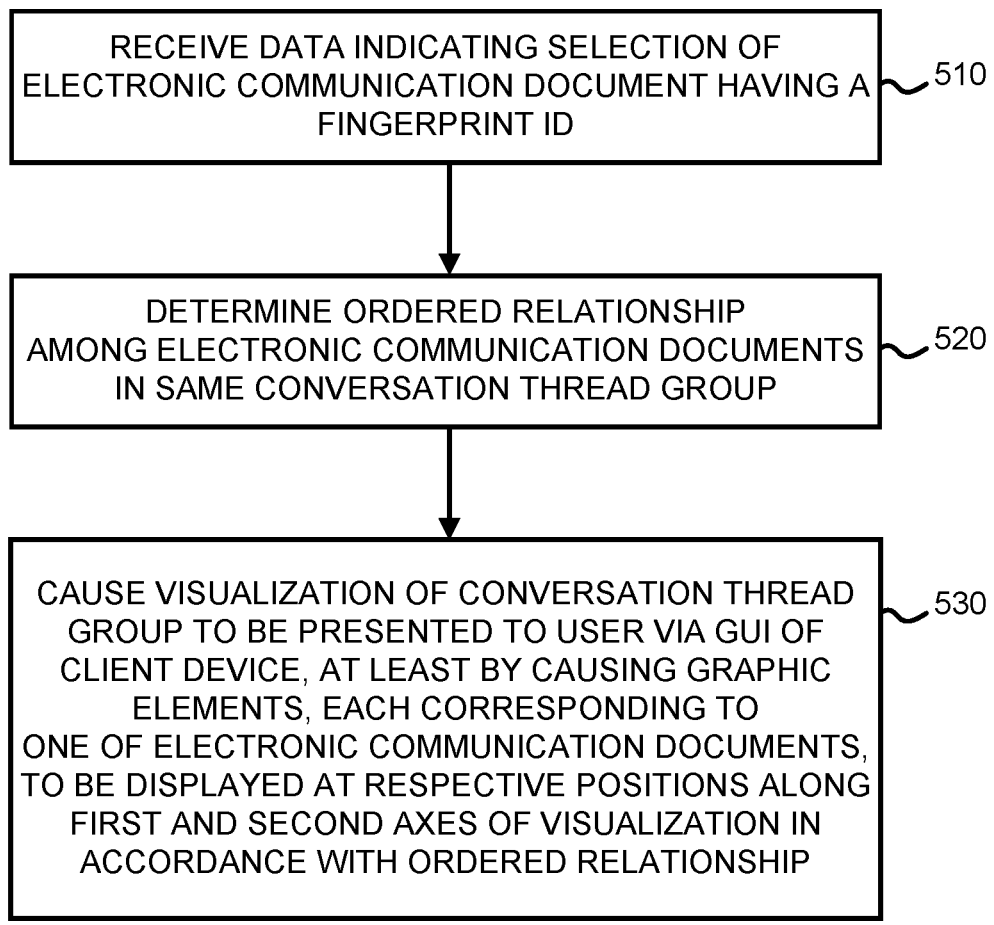
FIG. 8 is a flow chart of an example server-side method for facilitating a user's review of emails, according to one embodiment.
Figure 9:
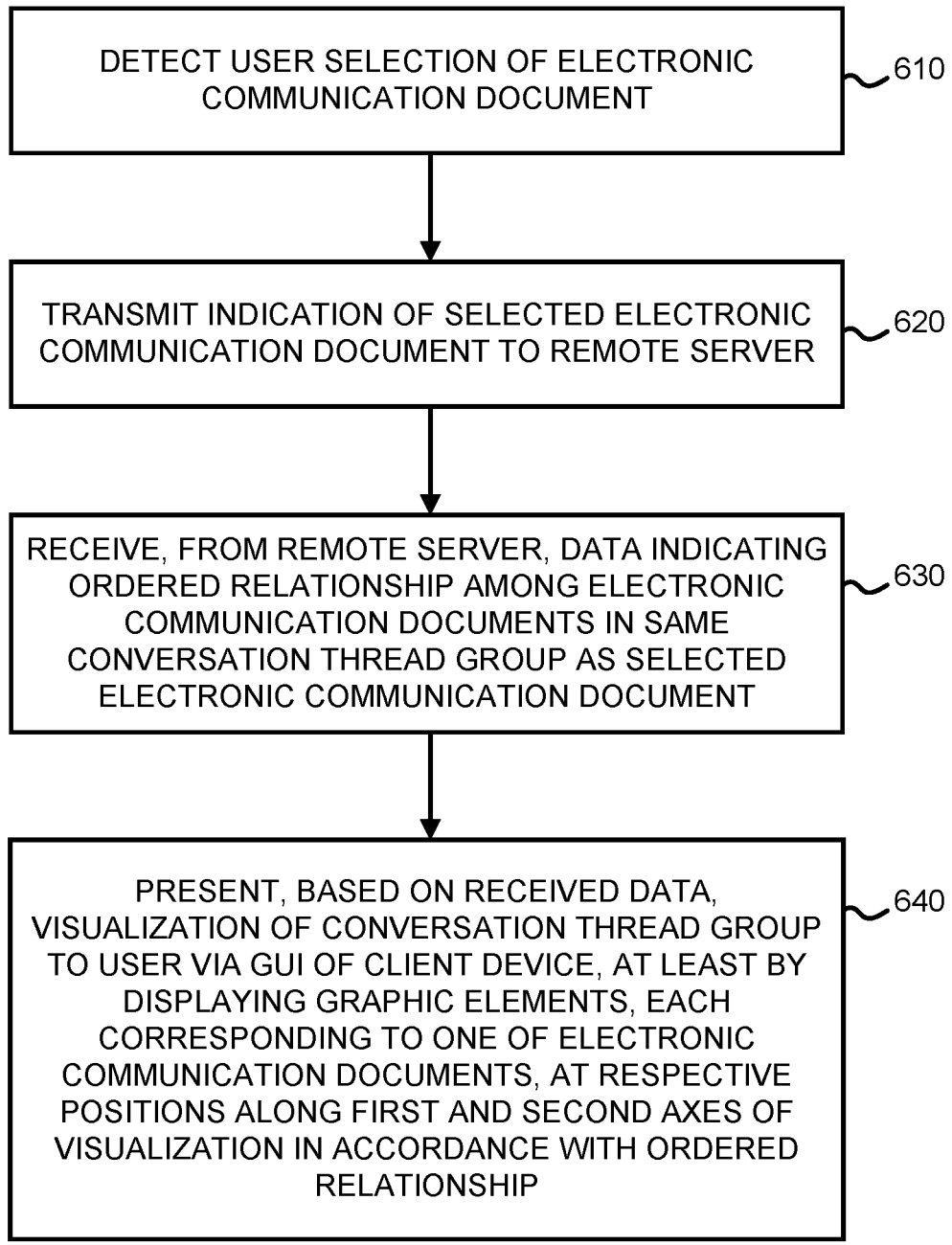
FIG. 9 is a flow chart of an example client-side method for facilitating a user's review of electronic communication documents, according to one embodiment.

Referring first to FIG. 8, an example method 500 may be implemented by one or more processors of a computing device or system, such as CPU 50 of web server 14 of FIG. 1. In the method 500, data indicating the selection of an electronic communication document (e.g., a particular email) having a fingerprint ID (e.g., as discussed above in connection with conversation threading unit 32 of FIG. 1) may be received (block 510). For example, a server implementing the method 500 may receive, from a client device (e.g., client device 12 of FIG. 1) data indicating that the user has entered or selected a unique document identifier corresponding to a specific electronic communication document. The client device may send the data to the server by executing instructions of a web page hosted by the server (e.g., within EDR website 54 of FIG. 1), for example.

In some embodiments, the received data itself does not indicate that the electronic communication document is associated with the fingerprint ID. Rather, a server or other device/system implementing the method 500 may use a document identifier in the received data to query whether a fingerprint ID has successfully been generated for the electronic communication document, or, in some embodiments, to request a not-yet-existing fingerprint ID for the electronic communication document. Such a query or request may be sent to another server or system (e.g., staging platform 16 of FIG. 1), for example, or sent to an internal unit of the device/system implementing the method 500. In some embodiments, the rest of method 500 does not proceed unless the selected electronic communication document is determined to have a fingerprint ID.

Thereafter, an ordered relationship among the electronic communication documents in the same conversation thread group as the selected electronic communication document may be determined (block 520). The ordered relationship specifies a time sequence of electronic communication documents in each of one or more conversation threads within the conversation thread group, with each of the one or more conversation threads beginning with a same root document and ending with a different end document. If there is more than one thread in the thread group, the ordered relationship also specifies the point or points at which the conversation threads branch apart.

In some embodiments, block 520 includes two discrete steps: first, identifying which other electronic communication documents are in the same thread group as the selected electronic communication document, and second, determining the ordered relationship among those identified documents. One or both of these steps may be accomplished by comparing hash values of the electronic communication documents (e.g., segment hash values within fingerprint IDs, as discussed above in connection with FIGS. 1, 3, and 5). In other embodiments, the device or system implementing the method 500 may receive (e.g., from staging platform 16 of FIG. 1) an indication of which electronic communication documents are known to be included in the thread group, in which case block 520 may include using metadata associated with the indicated documents to determine their ordered relationship (e.g., comparing segment hash values of fingerprint IDs).

A visualization of the conversation thread group is caused to be presented to a user via a GUI of a client device (block 530), at least by causing graphic elements to be displayed at respective positions along a first axis and a second axis of the visualization in accordance with the ordered relationship determined at block 520. Block 530 may include sending data indicative of the ordered relationship to a client device (e.g., to client device 12 via network 20 of FIG. 1) to cause the client device to render the visualization on a display (e.g., display 66 of FIG. 1), for example.

The first and second axes of the visualization may be the horizontal and vertical axes of the visualization, for example, or vice versa. The first axis may be indicative of how many electronic communications were sent, within a given conversation thread of the conversation thread group, after the root document was sent. For each branching point within the conversation thread group (if any branches are present), the second axis may be indicative of how many conversation threads stem from that branching point. Thus, within the visualization, a wider spatial distribution of graphic elements along the second axis may generally be indicative of more conversation threads in the conversation thread group. In some embodiments, however, the scale of the second axis (if viewed as a count of the number of threads) can differ from one branching point to the next within a single conversation thread group. For example, for clarity reasons (e.g., to prevent the overlap of graphic elements in different threads of the thread group), a first branching point may result in different branches/threads being spaced further apart on the second axis than the branches/threads of a second branching point, even if both branching points lead to the same number of branches/threads.

The graphic elements may be generally square-shaped, circle-shaped, or have any other general appearance. Each of the graphic elements may correspond to a different one of the electronic communication documents in the conversation thread group. In some embodiments, each graphic element is selectable by a user viewing the visualization at a client device. For example, a user selection of any one of the graphic elements may cause the text of the corresponding electronic communication document to be displayed to the user via the GUI of the client device. Additionally, or alternatively, in some embodiments, each graphic element is selectable by a user to edit the tags/designations for the corresponding electronic communication document. Moreover, the visualization may enable the user to select multiple graphic elements simultaneously, and apply a tag/designation to all of the corresponding emails by making a single selection of that tag/designation.

In some embodiments, additional information (beyond the ordered relationship) is determined at block 520, and used at block 530 to further enhance the visualization. For example, block 520 may also include determining which of the electronic communication documents in the conversation thread group are inclusive, have duplicates, have attachments, and/or are draft documents. Each of the graphic elements may then be displayed with a visual coding (e.g., a shape, shading, fill pattern, and/or any other suitable visual characteristic) that reflects these classifications.

As another example, block 520 may include determining which of the electronic communication documents in the conversation thread group is a reply-all, a reply that is not a reply-all, or a forward. The visual coding of each graphic element may then indicate which of these user-selected actions is associated with the corresponding electronic communication document.

As another example, block 520 may include identifying one or more missing or potentially missing electronic communication documents in the conversation thread group. The visualization may then include one or more additional graphic elements that correspond to the missing or potentially missing document(s), and display those additional graphic elements at respective positions along the first axis and the second axis of the visualization in accordance with the determined ordered relationship.

In addition, or alternatively, in some embodiments, the visual coding of each graphic element may indicate a particular user designation of the corresponding electronic communication document (e.g., "privilege," "not privilege," "responsive," etc.). The user designation may be indicated by the color of the graphic element, for example.

In some embodiments, the method 500 includes more, fewer, and/or different blocks than those shown in FIG. 8. For example, block 510 may be omitted, and the conversation thread group at issue may be dictated in a different manner (e.g., by receiving data indicating selection of the entire thread group).

Referring next to FIG. 9, an example method 600 may be implemented by one or more processors of a computing device or system, such as CPU 60 of client device 12 of FIG. 1. In the method 600, a user selection of an electronic communication document (e.g., a particular email) is detected (block 610). For example, a client device implementing the method 600 may determine that the user entered or selected a unique document identifier corresponding to a specific electronic communication document.

An indication of the selected electronic communication document is then transmitted to a remote server (block 620), such as web server 14 via network 20 of FIG. 1, for example. For example, a website such as EDR website 54 of FIG. 1 may include instructions that, when executed at the client device, cause an identifier that was entered or otherwise selected by the user at block 610 to be transmitted to the server.

Data indicating an ordered relationship among electronic communication documents that are in the same conversation thread group as the selected electronic communication document is then received (block 630). The ordered relationship specifies a time sequence of electronic communication documents in each of one or more conversation threads within the conversation thread group, with each of the one or more conversation threads beginning with a same root document and ending with a different end document. If there is more than one thread in the thread group, the ordered relationship also specifies the point or points at which the conversation threads branch apart.

The data indicating the ordered relationship may be received from the same remote server to which the indication of the selected document was transmitted at block 620. In some embodiments, block 630 (and the remainder of method 600) occurs only if the selected electronic communication document is determined (e.g., by the remote server) to be associated with a fingerprint ID, or only if a fingerprint ID can be generated for the selected electronic communication document.

Based on the data received at block 630, a visualization of the conversation thread group is presented to the user (block 640). The visualization may be presented via a GUI shown on a display (e.g., display 66 of FIG. 1) of a client device (e.g., the client device implementing the method 600). Block 640 includes displaying graphic elements at respective positions along a first axis and a second axis of the visualization in accordance with the ordered relationship indicated by the data received at block 630. Each of the graphic elements corresponds to one of the electronic communication documents in the conversation thread group. The visualization, including the meaning of the two visualization axes and any visual coding of the graphic elements, and also including ways in which the user may navigate, select, or edit documents represented by the graphic elements, may be similar to the visualization described above in connection with block 530 of the method 500, for example.

In some embodiments, the method 600 includes more, fewer, and/or different blocks than those shown in FIG. 9. For example, blocks 610 and/or 620 may be omitted, and the conversation thread group at issue may be determined without reference to any user-selected electronic communication document.

V. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for facilitating user review of electronic communication documents through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for facilitating user review of electronic communication documents, the computer-implemented method comprising:
    determining, by one or more processors, an ordered relationship among a plurality of electronic communication documents in a conversation thread group, wherein the ordered relationship specifies a time sequence of electronic communication documents in each of a plurality of conversation threads within the conversation thread group, wherein each of the plurality of conversation threads begins with a same root document of the plurality of electronic communication documents and ends with a different end document of the plurality of electronic communication documents, and wherein determining the ordered relationship includes identifying one or more missing electronic communication documents in the conversation thread group; and
    causing, by one or more processors, a visualization of the conversation thread group to be presented to a user via a graphical user interface of a client device, wherein causing the visualization of the conversation thread group to be presented to the user includes
        causing a plurality of graphic elements, each corresponding to a different one of the plurality of electronic communication documents, to be displayed at respective positions along a first axis and a second axis of the visualization in accordance with the determined ordered relationship, and
        causing one or more additional graphic elements, corresponding to the one or more missing electronic communication documents, to be displayed (i) at respective positions along the first axis and the second axis of the visualization in accordance with the determined ordered relationship, and (ii) with a particular visual coding that is not applied to the plurality of graphic elements and is reserved for missing electronic communication documents, including when any of the one or more missing electronic communication documents corresponds to a branching point between different conversation threads of the conversation thread group,
    wherein the first axis is indicative of how many electronic communications were sent, within a given conversation thread of the conversation thread group, after the root document was sent, and
    wherein, for each branching point of one or more branching points within the conversation thread group, the second axis is indicative of how many conversation threads stem from the branching point.

2. The computer-implemented method of claim 1, wherein:
    determining the ordered relationship among the plurality of electronic communication documents in the conversation thread group includes determining which of the plurality of electronic communication documents are inclusive electronic communication documents having unique message content and which of the plurality of electronic communication documents are non-inclusive electronic communication documents having no unique message content; and
    causing the visualization of the conversation thread group to be presented to the user includes causing each of the plurality of graphic elements to be displayed with a visual coding, the visual coding indicating whether the corresponding electronic communication document is an inclusive electronic communication document or a non-inclusive electronic communication document.

3. The computer-implemented method of claim 2, wherein:
    determining the ordered relationship among the plurality of electronic communication documents in the conversation thread group includes determining which of the plurality of electronic communication documents are duplicates; and
    the visual coding further indicates whether the corresponding electronic communication document has one or more duplicates within the plurality of electronic communication documents.

4. The computer-implemented method of claim 2, wherein:
    determining the ordered relationship among the plurality of electronic communication documents in the conversation thread group includes determining which of the plurality of electronic communication documents have attachments; and
    the visual coding further indicates whether the corresponding electronic communication document has one or more attachments.

5. The computer-implemented method of claim 2, wherein:
    determining the ordered relationship among the plurality of electronic communication documents in the conversation thread group includes determining which of the plurality of electronic communication documents are draft electronic communication documents; and the visual coding further indicates whether the corresponding electronic communication document is a draft electronic communication document.

6. The computer-implemented method of claim 2, wherein:
determining the ordered relationship among the plurality of electronic communication documents in the conversation thread group includes determining which type of user-selected action was associated with each of the plurality of electronic communication documents;
for each of the plurality of electronic communication documents, the type of user-selected action is either (i) a reply-all, (ii) a reply that is not a reply-all, (iii) a forward, or (iv) saving as a draft; and
the visual coding further indicates the type of user-selected action that was associated with the corresponding electronic communication document.

7. The computer-implemented method of claim 2, wherein the visual coding further indicates a user designation of the corresponding electronic communication document as belonging to a particular document category.

8. The computer-implemented method of claim 7, wherein causing each of the plurality of graphic elements to be displayed with a visual coding includes:
causing each of the plurality of graphic elements to be displayed with a visual coding that (i) uses a fill pattern or shading to indicate whether the corresponding electronic communication document is an inclusive electronic communication document or a non-inclusive electronic communication document, and (ii) uses a color to indicate the particular user designation of the corresponding electronic communication document.

9. The computer-implemented method of claim 2, wherein determining which of the plurality of electronic communication documents are inclusive electronic communication documents and which of the plurality of electronic communication documents are non-inclusive electronic communication documents includes:
comparing hash values of the plurality of electronic communication documents, each of the hash values being a hash of information in a single segment of a respective one of the plurality of electronic communication documents, and the single segment corresponding to a single header and a single message body within the respective electronic communication document; and
determining which of the plurality of electronic communication documents contains unique content based on the comparison of hash values.

10. The computer-implemented method of claim 1, wherein determining the ordered relationship among the plurality of electronic communication documents in the conversation thread group includes:
comparing hash values of the plurality of electronic communication documents, each of the hash values being a hash of information in a single segment of the respective electronic communication document, and the single segment corresponding to a single header and a single message body within the respective electronic communication document.

11. The computer-implemented method of claim 10, wherein determining the ordered relationship among the plurality of electronic communication documents in the conversation thread group includes:
using the hash values to determine where, along the first axis, a given conversation thread of the conversation thread group branches into multiple conversation threads.

12. The computer-implemented method of claim 1, wherein causing the visualization of the conversation thread group to be presented to the user via the graphical user interface of the client device includes:
sending to the client device, via a network, visualization data that is used by the client device to render the visualization.

13. The computer-implemented method of claim 1, wherein causing the visualization of the conversation thread group to be presented to the user includes:
causing the client device to, in response to the user activating one or more controls of the graphical user interface, designate a set of user-selected graphic elements as belonging to at least one of a plurality of available document categories, the plurality of available document categories including a category indicative of whether a document is responsive to a discovery request.

14. A computing system comprising:
an electronic document database;
one or more processors; and
one or more memories storing instructions that, when executed by the one or more processors, cause the one or more processors to
determine an ordered relationship among a plurality of electronic communication documents in a conversation thread group, wherein the ordered relationship specifies a time sequence of electronic communication documents in each of a plurality of conversation threads within the conversation thread group, wherein each of the plurality of conversation threads begins with a same root document of the plurality of electronic communication documents and ends with a different end document of the plurality of electronic communication documents, and wherein determining the ordered relationship includes identifying one or more missing electronic communication documents in the conversation thread group, and
cause a visualization of the conversation thread group to be presented to a user via a graphical user interface of a client device, at least by
causing a plurality of graphic elements, each corresponding to a different one of the plurality of electronic communication documents, to be displayed at respective positions along a first axis and a second axis of the visualization in accordance with the determined ordered relationship, and
causing one or more additional graphic elements, corresponding to the one or more missing electronic communication documents, to be displayed (i) at respective positions along the first axis and the second axis of the visualization in accordance with the determined ordered relationship, and (ii) with a particular visual coding that is not applied to the plurality of graphic elements and is reserved for missing electronic communication documents, including when any of the one or more missing electronic communication documents corresponds to a branching point between different conversation threads of the conversation thread group,
wherein the first axis is indicative of how many electronic communications were sent, within a given conversation thread of the conversation thread group, after the root document was sent, and wherein, for each branching point of one or more branching points within the conversation thread group, the second axis is indicative of how many conversation threads stem from the branching point.

15. The computing system of claim 14, wherein the instructions cause the one or more processors to:

determine the ordered relationship among the plurality of electronic communication documents in the conversation thread group at least by determining (i) which of the plurality of electronic communication documents are inclusive electronic communication documents having unique message content and which of the plurality of electronic communication documents are non-inclusive electronic communication documents having no unique message content, (ii) which of the plurality of electronic communication documents are duplicates, and (iii) which of the plurality of electronic communication documents have attachments; and cause the visualization of the conversation thread group to be presented to the user at least by causing each of the plurality of graphic elements to be displayed with a visual coding that indicates (i) whether the corresponding electronic communication document is an inclusive electronic communication document or a non-inclusive electronic communication document, (ii) whether the corresponding electronic communication document has one or more duplicates within the plurality of electronic communication documents, and (iii) whether the corresponding electronic communication document has one or more attachments.

16. The computing system of claim 15, wherein determining which of the plurality of electronic communication documents are inclusive electronic communication documents and which of the plurality of electronic communication documents are non-inclusive electronic communication documents includes:

comparing hash values of the plurality of electronic communication documents, each of the hash values being a hash of information in a single segment of a respective one of the plurality of electronic communication documents, and the single segment corresponding to a single header and a single message body within the respective electronic communication document; and determining which of the plurality of electronic communication documents contains unique content based on the comparison of hash values.

17. The computing system of claim 14, wherein:

the instructions cause the one or more processors to determine the ordered relationship among the plurality of electronic communication documents in the conversation thread group at least by comparing hash values of the plurality of electronic communication documents;

each of the hash values is a hash of information in a single segment of the respective electronic communication document; and the single segment corresponds to a single header and a single message body within the respective electronic communication document.

18. The computing system of claim 14, wherein causing the visualization of the conversation thread group to be presented to the user includes:

causing the client device to, in response to the user activating one or more controls of the graphical user interface, designate a set of user-selected graphic elements as belonging to at least one of a plurality of available document categories, the plurality of available document categories including a category indicative of whether a document is responsive to a discovery request.

19. A computer-implemented method for facilitating user review of electronic communication documents, the computer-implemented method comprising:

receiving, from a remote server, data indicating an ordered relationship among a plurality of electronic communication documents in an conversation thread group, wherein the ordered relationship specifies a time sequence of electronic communication documents in each of a plurality of conversation threads within the conversation thread group, wherein each of the plurality of conversation threads begins with a same root document of the plurality of electronic communication documents and ends with a different end document of the plurality of electronic communication documents, and wherein determining the ordered relationship includes identifying one or more missing electronic communication documents in the conversation thread group;

presenting, based on the received data, a visualization of the conversation thread group to a user via a graphical user interface of a client device, wherein presenting the visualization of the conversation thread group to the user includes displaying a plurality of graphic elements, each corresponding to a different one of the plurality of electronic communication documents, at respective positions along a first axis and a second axis of the visualization in accordance with the indicated ordered relationship, and displaying one or more additional graphic elements, corresponding to the one or more missing electronic communication documents, (i) at respective positions along the first axis and the second axis of the visualization in accordance with the determined ordered relationship, and (ii) with a particular visual coding that is not applied to the plurality of graphic elements and is reserved for missing electronic communication documents, including when any of the one or more missing electronic communication documents corresponds to a branching point between different conversation threads of the conversation thread group, wherein the first axis is indicative of how many electronic communications were sent, within a given conversation thread of the conversation thread group, after the root document was sent, and wherein, for each branching point of one or more branching points within the conversation thread group, the second axis is indicative of how many conversation threads stem from the branching point.

20. The computer-implemented method of claim 19, wherein displaying a plurality of graphic elements includes displaying each of the plurality of graphic elements with a visual coding, the visual coding indicating (i) whether the corresponding electronic communication document is an inclusive electronic communication document having unique message content or a non-inclusive electronic communication document having no unique message content, (ii) whether the corresponding electronic communication document has one or more duplicates within the plurality of electronic communication documents, and (iii) whether the corresponding electronic communication document has one or more attachments.

21. The computer-implemented method of claim 19, further comprising:
designating a set of user-selected graphic elements as belonging to a particular document category of a plurality of available document categories, the plurality of available document categories including a category indicative of whether a document is responsive to a discovery request.

* * * * *